United States Patent [19]

Merz et al.

[11] 4,322,330

[45] Mar. 30, 1982

[54] ADHESIVE FOR FLOOR COVERINGS, PROCESS OF ITS PRODUCTION AND ITS APPLICATION

[75] Inventors: Ekkehard Merz; Gerhard Kothe, both of Burghausen, Fed. Rep. of Germany

[73] Assignee: Wacker-Chemie GmbH, Munich, Fed. Rep. of Germany

[21] Appl. No.: 168,255

[22] Filed: Jul. 10, 1980

[30] Foreign Application Priority Data

Jul. 31, 1979 [DE] Fed. Rep. of Germany ........ 2931127

[51] Int. Cl.$^3$ .............................................. C08L 23/00
[52] U.S. Cl. ..................... 523/221; 525/107; 525/120; 525/122; 524/915; 524/522; 524/523; 524/528; 524/297; 524/314
[58] Field of Search ............... 260/29.6 E, 29.6 R, 260/29.6 RB, 29.6 MP, 42.13; 525/107, 120, 122

[56] References Cited

U.S. PATENT DOCUMENTS

| | | | |
|---|---|---|---|
| 3,027,337 | 3/1962 | Tritsch | 260/5 |
| 3,692,723 | 9/1972 | Kasagi et al. | 260/29.6 E |
| 3,758,433 | 9/1973 | Mullen | 260/29.6 E |
| 3,759,861 | 9/1973 | Shimokawa | 260/29.6 E |
| 3,778,399 | 12/1973 | Fazioli et al. | 260/29.6 E |
| 4,238,542 | 12/1980 | Burley | 260/29.6 E |

*Primary Examiner*—John Kight, III
*Assistant Examiner*—Amelia B. Yarbrough
*Attorney, Agent, or Firm*—Hammond & Littell, Weissenberger and Muserlian

[57] ABSTRACT

An adhesive for floor coverings containing
(a) 100 parts by weight of an aqueous polymer dispersion having a solids content of from 30% to 70% by weight of the total weight of said dispersion, the solids content consisting of synthetic resin particles of at least a bimodal particle size distribution wherein the majority of the larger particles is at least twice the size of the majority of the smaller particles and where the majority of the larger particles has a particle size distribution of from 0.5 to 3 μm and the majority of the smaller particles has a particle size distribution of from 0.1 to 1 μm,
(b) from 30 to 120 parts by weight of a plasticizing mixture of (1) from 45% to 100% by weight of a synthetic resin plasticizer/soft resin mixture with 1 part by weight of said platicizer per from 1 to 20 parts by weight of said soft resin, (2) from 0 to 20% by weight of at least one organic solvent, and (3) from 0 to 35% by weight of at least one hard resin and
(c) from 0 to 60% by weight of said adhesive of inert finely-divided fillers.

The adhesive is produced by mixing the aqueous polymer dispersion with the platicizer/soft resin mixture in a ratio of 1:0.3 to 1:1.2 and, optionally, by adding up to 60% by weight fillers, related to the total weight. The adhesive is particularly suitable for laying floor coverings of textile or foamed materials.

11 Claims, No Drawings

ADHESIVE FOR FLOOR COVERINGS, PROCESS OF ITS PRODUCTION AND ITS APPLICATION

BACKGROUND OF THE INVENTION

The invention concerns an adhesive for floor coverings based on an aqueous dispersion for laying floor coverings with a backing of textile materials or foamed plastics.

Heretofore the adhesives used primarily for such coverings consisted of balsam resin in combination with polyvinyl ether in a methanolic solution. They contain usually large amounts of fillers, particularly calcium carbonate powder. This type of adhesive is generally called "light plastic cement". Its characteristic properties are:

(a) long open assembly time,
(b) good wet stickiness, that is, there is no accidental detachment of the covering from the floor, even immediately after the laying,
(c) good adhesive strength,
(d) good waterproofness,
(e) possibility of making corrections to a certain extent during the laying, a measure of which can be seen in the fact that the adhesive is ropy during the hardening.

These adhesives, however, suffer the drawbacks of
(f) fire hazards based on the content of the methanolic solution and
(g) physiological hazards based on its methanol content, which requires special precautions at the work place of the processor and adequate ventilation when being applied.

OBJECTS OF THE INVENTION

An object of the present invention is the development of an adhesive for floor coverings based on aqueous polymer dispersions, having the desired properties of the "light plastic cement" without its drawbacks.

Another object of the present invention is the obtaining of an adhesive for floor coverings containing (a) 100 parts by weight of an aqueous polymer dispersion having a solids content of from 30% to 70% by weight of the total weight of said dispersion, the solids content consisting of synthetic resin particles of at least a bimodal particle size distribution wherein the majority of the larger particles is at least twice the size of the majority of the smaller particles and where the majority of the larger particles has a particle size distribution of from 0.5 to 3 $\mu m$ and the majority of the smaller particles has a particle size distribution of from 0.1 to 1 $\mu m$,
(b) from 30 to 120 parts by weight of a plasticizing mixture of (1) from 45% to 100% by weight of a synthetic resin plasticizer/soft resin mixture with 1 part by weight of said plasticizer per from 1 to 20 parts by weight of said soft resin, (2) from 0 to 20% by weight of at least one organic solvent, and (3) from 0 to 35% by weight of at least one hard resin and
(c) from 0 to 60% by weight of said adhesive of inert finely-divided fillers.

A further object of the present invention is the development of a process for the preparation of the above adhesive for floor coverings.

A still further object of the present invention is the improvement in the process of laying floor coverings comprising using the above adhesive for floor coverings.

These and other objects of the invention will become more apparent as the description thereof proceeds.

DESCRIPTION OF THE INVENTION

The subject matter of the invention is an adhesive for floor coverings comprising (a) 100 parts by weight of an aqueous polymer dispersion with a solids content of from 30% to 70% by weight of the total weight of the dispersion, where the solids content consists of synthetic resin particles of various sizes, where the majority of the larger particles is double the size of the majority of the smaller particles, and where the majority of the larger particles has a particle size of from 0.5 to 3 $\mu m$ and the majority of the smaller particles has a particle size of 0.1 to 1 $\mu m$,
(b) 30 to 120 parts by weight of a plasticizer/soft resin mixture with 1 part by weight of synthetic resin plasticizer per 1 to 20 parts by weight of soft resin.

More particularly the present invention relates to an adhesive for floor coverings containing (a) 100 parts by weight of an aqueous polymer dispersion having a solids content of from 30% to 70% by weight of the total weight of said dispersion, the solids content consisting of synthetic resin particles of at least a bimodal particle size distribution wherein the majority of the larger particles is at least twice the size of the majority of the smaller particles and where the majority of the larger particles has a particle size distribution of from 0.5 to 3 $\mu m$ and the majority of the smaller particles has a particle size distribution of from 0.1 to 1 $\mu m$,
(b) from 30 to 120 parts by weight of a plasticizing mixture of (1) from 45% to 100% by weight of a synthetic resin plasticizer/soft resin mixture with 1 part by weight of said plasticizer per from 1 to 20 parts by weight of said soft resin, (2) from 0 to 20% by weight of at least one organic solvent, and 3) from 0 to 35% by weight of at least one hard resin and
(c) from 0 to 60% by weight of said adhesive of inert finely-divided fillers.

The adhesive for floor converings of the present invention has all the advantageous properties (a) to (e) listed above for the "light plastic cements". However, compared to the "light plastic cements" it is also characterized in that it avoids fire hazards due to a methanolic solution, and physiological hazards due to a methanol content. The methanol content of the "light plastic cements" requires special precautions at the working place of the processor (the "light plastic cement" must be marked for its hazard of methanol inhaling, in contrast to the adhesive for floor coverings according to the present invention).

The adhesive according to the invention is particularly suitable for use in laying floor coverings of textile materials or foamed materials, preferably of foamed PVC and of foamed natural or synthetic rubber, or materials backed with textile or foam.

The adhesive for floor covering according to the invention is obtained by mixing the dispersion characterized in (a) above with the plasticizing mixture containing the plasticizer/soft resin mixture described in (b) in a weight ratio of 1:0.3 to 1:1.2 in a dissolver or any other suitable mixer. Any optional filler content of component (c) is added thereafter.

The aqueous polymer dispersions of component (a) to be employed are particularly those which have a minimum film-forming temperature of between 0° and 20° C., or glass transition temperature of between −20° C. and 20° C. and have a bimodal particle size distribution.

Such synthetic resin dispersions with bimodal particle size distribution, in contrast to the usual particle size distribution with a particle size range in which the majority of the solid particles are found (gaussian distribution), have at least and mostly two ranges in which the particle sizes are mostly found, and which are separate from a range in which the number of particles with a corresponding size pass through a relative minimum related to the total number of particles.

A relative maximum of the number of particles in the polymer dispersion (a) is at particles with a size of 0.1 to 1 $\mu$m, a second at particles with a size of 0.5 to 3 $\mu$m. In the polymer dispersions suitable for use in the adhesives according to the invention, the relative maximum of the larger particles should be at a particle size which has at least the double value compared with the particle size of the other relative maximum.

Preferably the solid of dispersion (a) consists of from 50% to 80% by weight, particularly from 60% to 75% by weight, based on the total weight of the solid in dispersion (a), of the larger synthetic resin particles, and of from 20% to 50%, particularly from 25% to 40% by weight, of the smaller synthetic resin particles.

The synthetic resin dispersions in the adhesive according to the invention are primarily selected from polymer dispersions which are suitable for use in conventional dispersion adhesives, for example, homopolymers of vinyl $C_{2-18}$-alkanoic acids or preferably copolymers where said vinyl esters of $C_{2-18}$-alkanoic acids are particularly vinyl acetate, vinyl propionate, vinyl laurate, homopolymers and copolymers of olefins, particularly ethylene, butadiene and styrene, and homopolymers and copolymers of $C_{1-8}$-alkyl esters of unsaturated mono- and dicarboxylic acids, particularly $C_{1-8}$-alkyl lower alkenoates and mono- or di-$C_{1-8}$-alkyl $C_{4-8}$-alkendioates such as methyl, ethyl, propyl, butyl, ethylhexyl acrylates and maleates.

Preferred among these monomers are the vinyl esters, ethylene, the acrylates, the maleates and butadiene. Mostly the copolymer dispersions of ethylene/vinyl acetate and vinyl acetate/vinyl laurate are preferred.

Bimodal polymer dispersions can be obtained, as described by Türck, Angew. Makromolekulare Chemie, 46, (1975) 109 to 133 or by Keppler et al. ibid, 2, (1968) 1 to 25.

Preferably, however, the bimodal polymer dispersions are produced by mixing two specially prepared dispersions of different particle size. Polymer dispersions can also be produced from polymers with different glass transition temperatures (Tg), for example, by mixture of those with a Tg of −20° to 0° C., and those with a Tg of 0° to +20° C., preferably 0° to +10° C. The polymer dispersion from the larger sized polymer particles can contain the polymer with the higher Tg value. Preferably, however, the polymer dispersion from the larger sized polymer particles contains the polymer with the lower Tg value. Individual polymer dispersions are recited in the Examples.

Surprisingly, such a selection of dispersions with polymers of different glass transition temperatures results frequently in an increased cohesion of the dispersion film or of the adhesive film.

Component (b) used for the production of the adhesive for floor coverings according to the invention is a plasticizing mixture containing a plasticizer-soft resin mixture of at least one, but preferably two, soft resins in combination with a synthetic resin plasticizer or monomer plasticizer familiar to the man skilled in the art, for example, phthalate plasticizers, sebacinate plasticizers, adipinate plasticizers or phosphate plasticizers. Examples are the diesters of phthalic acid, sebacic acid and adipic acid with $C_{4-18}$ alkanols such as butanol, octanol, nonanol, isodecanol; the esters, particularly the tertiary esters of phosphoric acid with the above-mentioned alkanols, but also with aromatic hydrocarbon hydroxy compounds, like phenol, cresol and hydroxyxylene.

A soft resin is a resin whose viscosity at 20° C. is in the range of from 5 to 50 Pas, preferably of 10 to 25 Pas, and whose softening point according to KraemerSarnow (see DIN 1995) is between 0° and 15° C. Such resins are, for example: colophonium/triethylene glycol esters, such as Rocrasin ® ester D 115, Granolite ® 150, Staybelite ® ester 3, colophonium/diethylene glycol esters, like Dertoline ® DEG, polyterpene resins like Dercolyte ® A 10 and S 10, natural resin acids esterified with polyether alcohols like soft resin KTN ®, liquid coumarone/indene resins, like coumarone/indene resin B 1/liquid, Necirés ® RF 10.

The plasticizer/soft resin mixture used in component (b) is used in amounts of 30 to 120, preferably 50 to 100 parts by weight per 100 parts by weight of the aqueous synthetic resin dispersion of component (a). The plasticizer/soft resin mixture contains generally 1 to 20 parts by weight of soft resin per part of plasticizer and generally has a viscosity of preferably 500 to 10,000 mPas, particularly 800 to 7,000 mPas.

Up to 35% by weight of plasticizer-soft resin mixture can be replaced by hard resins. The hard resins are resins with softening points according to KraemerSarnow of 60° to 150° C. and with melting points above 60° C. (capillary method according to DIN 53 181).

Such resins are, for example, terpene/phenol resins, like Alresen ® PT 214, polymerized root and balsam resins, like Neutrex ® WW, tall resins, like Polros ® A, hydrocarbon resins, like Escorez ® 1102, 3102, Hercurez ® A 80, AR 115, A 150, polymerized hydrocarbon resins, like Necirés ® ALX-100, coumarone/indene resins, like coumarone/indene resin B 1-75-TN and B 1-85-TN, Necirés ® RF 75 and RF 85.

It is also possible to incorporte in the plasticizer-soft resin mixture small amounts of organic solvents (up to about 20% by weight), preferably toluene.

The mixture of plasticizer and resins, as well as optional solvents, is generally prepared in kettles with stirrers or in kneaders.

For controlling the adheisve strength and other physical properties, the customary additives such as inert finely-divided fillers, can be incorporated in the adhesive according to the invention in an amount of 60% by weight, based on the total weight of the adhesive. These fillers are powdered calcium carbonates, quartz powders, lencinite, kaolin, as well as silicates of different particle sizes, or mixtures thereof.

The following examples will further illustrate the invention without being limitative in any fashion.

EXAMPLE 1

An aqueous ethylene/vinyl acetate copolymer dispersion with a bimodal particle size distribution, a solid content of 53% by weight, and a viscosity of 1,700 mPas (Epprecht-rheometer STV C 3) was used as component (a). The particle size of the polymer particles with the smaller diameter was mainly between 0.1 and 0.5 μm, particularly about 0.4 μm. The particle size of the polymer particles with the larger particle diameter was mainly between 0.5 with 3 μm, particularly 1 μm. The glass transition temperature Tg of the coarser particles was about $-5°$ C., that of the finer particles $+1°$ C. The coarser particles were present in an amount of about 70% by weight of the total particles.

The plasticizer/soft resin mixture had the following composition:

Colophonium/triethylene glycol ester (soft): 40 parts by weight
Coumarone/indene resin B 1-75 TN (hard): 20 parts by weight
Coumarone/idene resin B 1 liquid (soft): 20 parts by weight
Dibutyl phthalate: 10 parts by weight
Toluene: 10 parts by weight The copolymer dispersion was mixed with the plasticizer/soft-resin mixture in a ratio of 1:0.75 in a vessel with a high speed stirrer. Subsequently 30% by weight, based on the total weight, of quartz powder with a particle size under 100 μm and a commercial preservative were incorporated. The ready-to-use adhesive contained:

40 parts by weight: Dispersion
30 parts by weight: Resin solution
30 parts by weight: Quartz powder
0.1 parts by weight: Preservative

EXAMPLE 2

Example 1 was repeated, with a plasticizer/soft resin mixture solution of the following composition:

Colophonium/triethylene glycol ester: 11.25 parts by weight
Coumaron-indene resin B 1/liquid: 15.0 parts by weight
Di-isodecyl phthalate: 3.75 parts by weight

EXAMPLE 3

Example 1 was repeated, with a plasticizer/soft resin mixture of the following composition:

Colophonium/triethylene glycol ester (soft): 24 parts by weight
Soft resin KTN (soft): 10 parts by weight
Alresen ® PT 214 (hard): 41 parts by weight
Dibutyl phthalate: 10 parts by weight
Toluene: 15 parts by weight

EXAMPLE 4

Example 1 was repeated, using, as a copolymer dispersion, a vinyl acetate/vinyl laurate copolymer with a solids content of 50% by weight, a principal particle size of the larger particles of between 1 and 2 μm and a principal particle size of the smaller particles of 0.1 μm. The larger particles represent 70% by weight of the solid resin of the dispersion, the amount of the smaller particles is 30% by weight of the solid resin of the dispersion.

Any one of the adhesives of the above examples could be employed to cement floor coverings of textile or foamed materials or floor coverings backed with textile or foamed backings in the customary manner.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. An adhesive for floor coverings containing
   (a) 100 parts by weight of an aqueous polymer dispersion having a solids content of from 30% to 70% by weight of the total weight of said dispersion, the solids content consisting of particles of synthetic resins selected from the group consisting of homopolymers and copolymers of vinyl $C_{2-18}$-alkanoates, homopolymers and copolymers of olefins and styrene, and homopolymers and copolymers of $C_{1-8}$-alkyl esters of lower alkenoic acids and $C_{4-8}$-alkendioic acids, said particles of at least a bimodal particle size distribution wherein the majority of the larger particles is at least twice the size of the majority of the smaller particles and where the majority of the larger particles has a particle size distribution of from 0.5 to 3 μm and the majority of the smaller particles has a particle size distribution of from 0.1 to 1 μm,
   (b) from 30 to 120 parts by weight of a plasticizing mixture of (1) from 45% to 100% by weight of a synthetic resin plasticizer/soft resin mixture with 1 part by weight of said plasticizer selected from the group consisting of phthalate plasticizers, sebacinate plasticizers, adipinate plasticizers and phosphate plasticizers per from 1 to 20 parts by weight of said soft resin having a viscosity of 20° C. in the range of from 5 to 50 Pas and a softening point according to Kraemer-Sarnow of between 0° and 15° C., (2) from 0 to 20% by weight of at least one organic solvent, and (3) from 0 to 35% by weight of at least one hard resin having a softening point according to Kraemer-Sarnow of 60° C. to 150° C. and a melting point above 60° C., and
   (c) from 0 to 60% by weight of said adhesive of inert finely-divided fillers.

2. The adhesive for floor coverings of claim 1 wherein, in the aqueous polymer dispersion of component (a) the portion with the larger polymer particles represents from 50% to 80% by weight, based on the total weight of the solid in the dispersion.

3. The adhesive for floor coverings of claim 2 wherein the portion with the larger polymer particles represents from 60% to 75% by weight, based on the total weight of the solid in the dispersion.

4. The adhesive for floor coverings of claim 1 or 2 wherein from 1% to 20% of an organic solvent is present in the plasticizing mixture of component (b).

5. The adhesive for floor coverings of claim 1 or 4 wherein from 1% to 35% of a hard resin is present in the plasticizing mixture of component (b).

6. The adhesive for floor coverings of claim 1 or 2 wherein from 1% to 60% by weight of said adhesive of said inert finely-divided fillers of component (c) are present.

7. A method for the production of the adhesive for floor coverings of claim 1 consisting essentially of mixing said aqueous polymer dispersion of component (a) with said plasticizing mixture of component (b) in a mixing ratio of from 1:0.3 to 1:1.2 and thereafter optionally adding component (c).

8. In the method of cementing floor coverings to the floor, comprising applying a layer of a liquid adhesive to either the floor or the floor coverings or both and laying the floor coverings on the floor, the improvement consisting of using the adhesive for floor coverings of claim 1, as said liquid adhesive.

9. The adhesive for floor coverings of claim 4 wherein from 1% to 35% of a hard resin is present in the plasticizing mixture of component (b).

10. The adhesive for floor coverings of claim 4 wherein from 1% to 60% by weight of said adhesive of said inert finely-divided fillers of component (c) are present.

11. The adhesive for floor coverings of claim 5 wherein from 1% to 60% by weight of said adhesive of said inert finely-divided fillers of component (c) are present.

* * * * *